United States Patent

Bramati

[11] 4,128,377
[45] Dec. 5, 1978

[54] UNMOULDING MACHINE FOR CONFECTIONARY PRODUCTS

[75] Inventor: Carlo Bramati, Milan, Italy

[73] Assignee: Carle & Montanari S.p.A., Milan, Italy

[21] Appl. No.: 794,260

[22] Filed: May 5, 1977

[30] Foreign Application Priority Data

Aug. 6, 1976 [IT] Italy .............................. 26108 A/76

[51] Int. Cl.² .......................... A23G 1/26; B65G 65/02
[52] U.S. Cl. .................................... 425/439; 198/403; 214/311; 214/312
[58] Field of Search ..................... 425/439, 357, 403.1, 425/DIG. 201, 200; 164/409; 198/403, 408, 409, 485; 214/311, 312, 314, 89

[56] References Cited

U.S. PATENT DOCUMENTS

| 969,071 | 8/1910 | Loomis | 425/439 |
| 1,227,764 | 5/1917 | Dupuy | 425/439 |
| 1,323,356 | 12/1919 | Dupuy | 425/439 X |
| 1,425,449 | 8/1922 | Cary | 425/439 X |
| 1,956,192 | 4/1934 | Donnelly | 425/439 |
| 3,337,069 | 8/1967 | Burger | 214/89 |

FOREIGN PATENT DOCUMENTS

| 2019008 | 11/1971 | Fed. Rep. of Germany | 214/311 |
| 525318 | 8/1940 | United Kingdom | 425/439 |

*Primary Examiner*—Francis S. Husar
*Assistant Examiner*—William R. Briggs
*Attorney, Agent, or Firm*—Kirschstein, Kirschstein, Ottinger & Cobrin

[57] ABSTRACT

An unmoulding machine for confectionery products and in particular for chocolate products, in which a device for placing plates is followed by a means interlocked with a conveyor carrying full moulds for lifting and moving the full moulds from the level of the conveyor to an overlying level, followed after the full-mould conveyor by a device for rotating the said moulds, and the said rotation device being followed by a conveyor for removing the unmoulded product and a conveyor for removing the empty moulds above the conveyor belt carrying the unmoulded product.

4 Claims, 6 Drawing Figures

UNMOULDING MACHINE FOR CONFECTIONARY PRODUCTS

BACKGROUND OF THE INVENTION

The present invention relates to an unmoulding machine for confectionery products and in particular for chocolate products.

An unmoulding machine for chocolate products is already known, in which the full moulds are covered by a so-called plate allowing, after rotating the mould together with the plate through 180°, to unmould the product onto the said plate.

The drawback of this unmoulding machine consists essentially in having always to use the said plate with known troubles resulting therefrom.

In general, in modern unmoulding installations, the use of the plate is limited to the so-called store products, for example chocolates which are manually phantasy packaged.

Chocolate bars and tablets could, however, be unmoulded directly on a conveyor belt carrying the product to the wrapping machines.

There exists in addition, also, the possibility of removing the finished product directly from the moulds to put it successively into suitable packaging boxes, using for this purpose a known machine for transferring the material from the mould to the packaging boxes.

SUMMARY OF THE INVENTION

The object of this invention is to provide simple means enabling within a single manufacturing installation to unmould the product from the forming moulds directly onto a conveyor belt, to unmould the product on suitable plates or to unmould the finished product by means of a suitable machine already known for placing it successively and directly into the desired packaging means.

This object is reached by means of an unmoulding machine in which the device for placing the plates is followed at the level of the full-mould conveyor belt by an interlocked means for raising and moving the moulds from the level of the conveyor belt to an overlying level, on which, downstream of full-mould conveyor, there is provided a device for rotating the said moulds and where the said rotation device is followed by a conveyor belt for moving the unmoulded product and a conveyor belt for moving the empty moulds, on a level overlying the unmoulded product conveyor belt.

This system enables by simple and functional means unmoulding of the product directly on a conveyor belt or unmoulding of the product on suitable plates or unmoulding by means of a suitable taking-up machine that removes the product, and all these steps are made possible in a single installation which, by adding the means according to this invention, becomes a universal unmoulding installation allowing to apply all the above-mentioned unmoulding steps at present in use in the confectionery art.

Other advantages and characteristics of this invention can be observed in the following description, the claims and the accompanying drawings.

BRIEF DESCRIPTION OF THE DRAWINGS

The objects according to this invention will now be described in detail with some forms of execution given by way of example and illustrated in the accompanying drawings in which.

DESCRIPTION OF THE PREFERRED EMBODIMENTS

Figure 1:
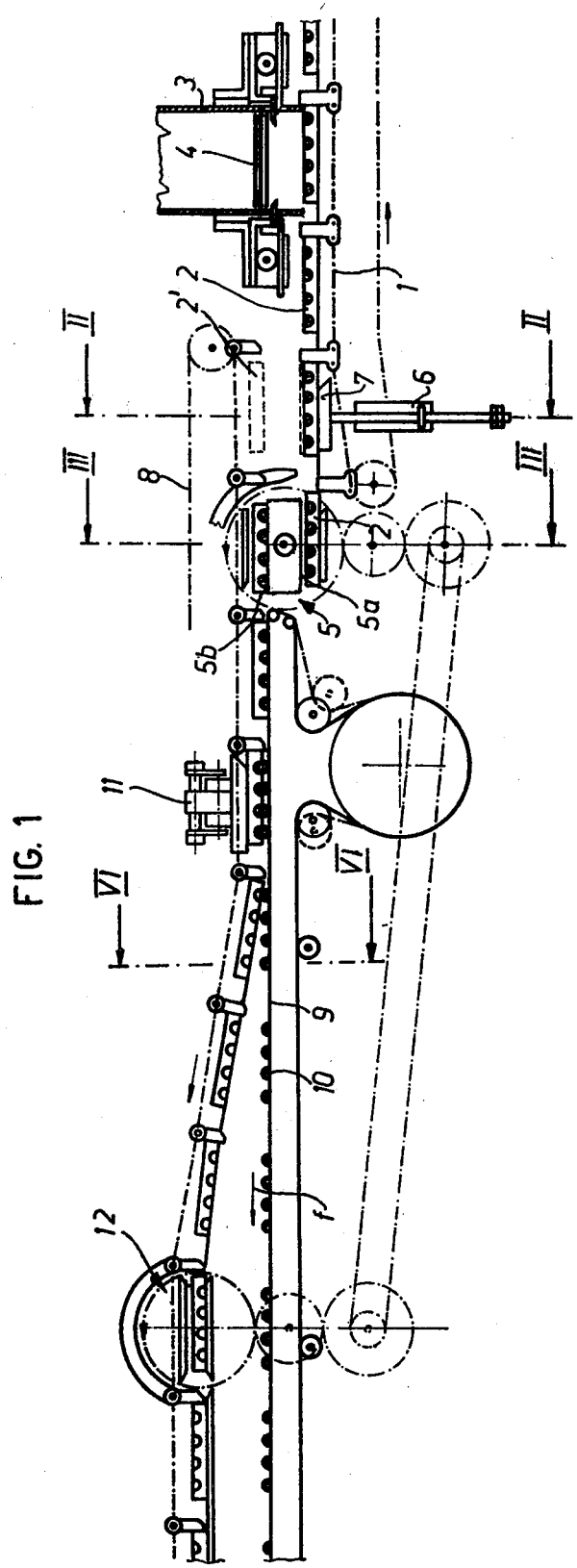
FIG. 1 is a schematic drawing of the unmoulding machine according to this invention.

As clearly shown in FIG. 1, the unmoulding installation comprises a conveyor 1 for feeding the filled moulds 2. Above the moulds 2 is a known magazine 3 for storing and successively placing the plates 4 onto the tops of the moulds 2. At the end of the conveyor 1 there is a device 5 for rotating the moulds. Upstream of the rotation device 5 and below the conveyor 1, is provided a lifting means 6 for raising the moulds, consisting, for example, of a hydraulic or pneumatic cylinder, whose rod has at its free end a lifting table 7. This lifting means 6 raises the moulds 2 supplied by the conveyor 1 from the level of the latter to a second level schematically indicated by a mould 2' shown in dotted lines.

On the upper level, the elevated mould 2' is received by a further conveyor, for example a chain conveyor 8 shown in dotted lines.

Downstream of the rotation device 5, below the chain conveyor 8, there is provided a belt conveyor 9 to receive the unmoulded product 10 and move it in direction of the arrow f.

As clearly shown in FIG. 1, the lower level 5a of the rotation device 5 essentially corresponds to the upper level of the mould 2, while the upper level 5b of the rotation device 5 coincides with the lower level of the raised mould 2' and with the level of the conveyor belt 9 for moving the unmoulded product 10.

Still further, as shown in FIG. 1, the conveyor 8 leads right up to a vibrator 11 appoximately parallel to the conveyor 9 moving the unmoulded product 10 and the said conveyor 8 then continues its course on a level overlying that of the conveyor 9. In a preferred embodiment, also the conveyor 8 is provided downstream of the vibrator 11 with a rotation means 12.

Figure 2:
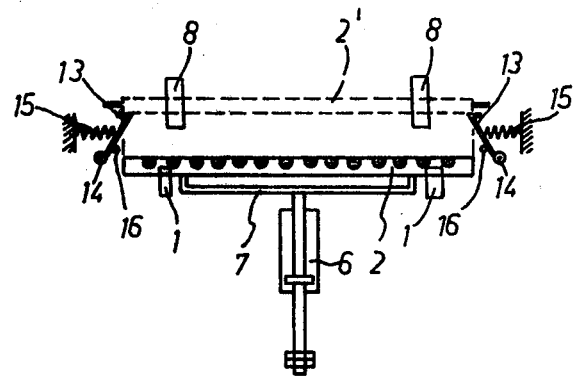
FIG. 2 is a detail shown in cross-section along line II—II of FIG. 1.

The lifting device 6 is shown schematically in FIG. 2. This device consists of a hydraulic or pneumatic piston seated below the conveyor 1 schematically indicated by its driving means. The free end of the rod of the piston 6 is equipped with a lifting table 7 which, when driven, moves the mould 2 from the position indicated in full lines to that indicated by dotted lines 2'. To keep the mould in the position 2' after the return of the piston 6, 7 to its initial position, supporting sections 13 are provided on both sides of the mould and running parallel to the conveyor 8 schematically indicated by its driving means. The said supporting sections 13 are sustained in an oscillable manner at their lower ends by rotating pivots 14 and springs 15, advantageously helical springs which push the section 13 into their supporting positions advantageously limited by stops 16.

Figure 3:
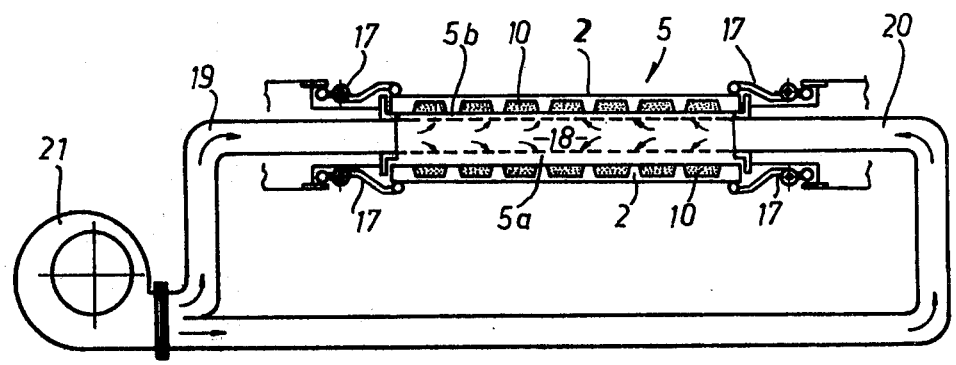
FIG. 3 is a further detail of the installation shown in cross-section along the line III—III of FIG. 1.

The rotation device 5, as shown in FIG. 3, is provided with lateral clamps 17 that keep the moulds 2 locked during the rotation phase of the device 5. These clamps 17 are preloaded by springs and controlled by cams or similar means, not shown for reason of clearness. To avoid damaging the product 10 during its rotation by the device 5, the latter consists advantageously of a hollow body 18 with perforated walls 5a, 5b. The said walls 5a, 5b are connected with a hollow chamber 18 which, in turn, is connected to ducts 19 and 20 supplying compressed air to the chamber 18, generated for example by a fan 21. The said compressed air leaving the chamber 18 of the rotation device 5 through the perforated walls 5a, 5b forms moving films between the walls 5a, 5b and the product 10 thus preventing any damage to the product when sliding over the walls 5a, 5b. Advantageously, the tube 19, 20 forms at the same time the axis of rotation of the device 5. It is obvious that the chamber 18 is hermetically sealed off against the tube 19, 20 to prevent egress of the compressed air at the points the device 5 is engages the tubes 19, 20. The rotation device 5 shown in FIG. 3, is particularly simple in its construction and ensures a safe operation. It is, however, limited to those products which have a sufficiently large flat surface allowing the use of compressed air a sliding cushion.

Figure 4:
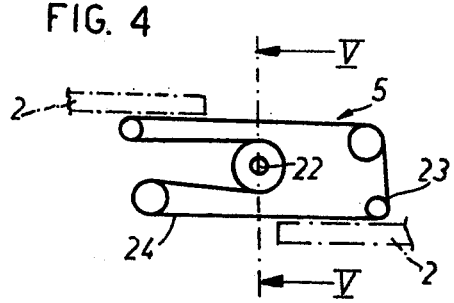
FIG. 4 is a schematic view of a device for rotating the moulds.
Figure 5:
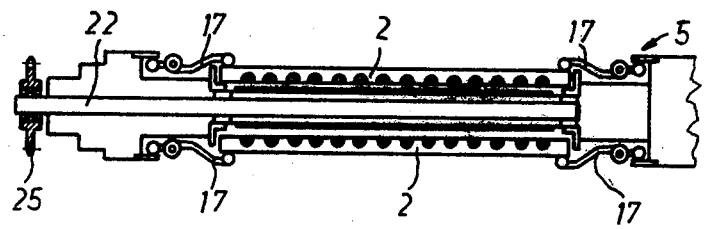
FIG. 5 is cross-section through the rotation device along the the line V—V of FIG. 4.

The rotation devices shown in FIGS. 4 and 5 is more suitable for the treatment of small items, for example chocolate pills and similar. In this embodiment the rotation device as shown in FIGS. 4 and 5 consists of a central rotation shaft 22 carrying a roller mechanism 23 supporting a conveyor belt 24. The movement of the conveyor belt 24 is controlled in such a manner that the belt is moving both during the introduction and during the discharge of a mould 2 and always in the direction of the latter preventing thus that the small chocolate items are damaged.

Figure 6:
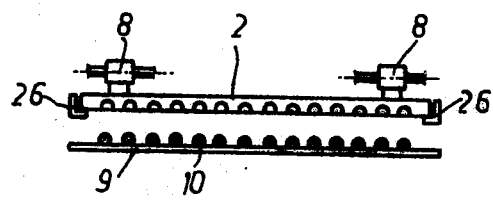
FIG. 6 is a further detail of the installation in cross-section along the line VI—VI of FIG. L.

Advantageously, as also shown in FIG. 5, the device 5 is rotated by means of a shaft 22 driven by a gear 25 or similar means. Also in this case, the rotation device 5 is provided with lateral clamps 17 for locking the moulds 2 during the rotation of the device 5. When rotating the device the belt 24 is not moving. As shown in FIG. 6, the conveyor 8 of moulds 2, once having passed the vibration 11 (FIG. 1) and guided by the L-shaped sections 26 following the locking sections 13 which are moveable (see FIG. 2), leaves the conveyor belt 9 for the finished product.

A packaging machine for the product 10 may be positioned downstream of the belt conveyor 9 as well as a device allowing to recycle the plates 4 to the production plant.

A device for recovering the empty moulds 2 may be provided downstream of the conveyor 8 or, if the said moulds are not yet emptied, a machine may be installed at this point for removing the product directly from the moulds 2 and transferring it to packaging containers.

The operation of the unmoulding machines according to this invention is as follows:

When using the plate unmoulding method, a plate 4 is placed on top of a mould 2 transported by the belt 1 and the mould 2 still covered by the plate is inserted into the rotating device 5 and rotated through 180°, then moved toward the vibrator 11 which ensures the shaking out of the finished product 10 onto the plate 4 which then continues its course on the conveyor 9, while the emptied moulds are removed by the chain conveyor 8. The same method is used for the unmoulding of chocolate bars and tablets without, however, covering the moulds with plates 4.

When it is desired to remove the product directly from the moulds 2, using for this purpose the piston 6, 7, the mould is raised to the position 2' where it is locked by the guide sections 13 shown in FIG. 2 and the group is then moved by the chain conveyor 8 directly to a known product removing machine, which now removes the product and places the same into packaging boxes.

The unmoulding plant according to this invention can also advantageously be used for unmoulding hollow chocolate products, such as chocolate eggs and the like.

We claim:

1. A dual mode machine for unmoulding confectionery products and, in particular, chocolate products, from moulds said machine comprising:
    (A) a plurality of molds and a first conveyor having a horizontal reach at a first level for receiving filled moulds,
    (B) a multiplicity of plates,
    (C) means above the first conveyor for applying plates on the tops of the moulds on the first conveyor,
    (D) a second conveyor downstream of the plate applying means,
        (i) said second conveyor having a horizontal reach at a second level which is higher than said first level of said horizontal reach of the first conveyor;
        (ii) said horizontal reach of the second conveyor having a portion overlying a portion of the horizontal reach of the first conveyor;
    (E) a vertically translatory lifting device downstream of the plate applying means for raising moulds from the horizontal reach of the first conveyor to the horizontal reach of the second conveyor,
    (F) a rotating device downstream of the lifting device for accepting moulds from the first conveyor, inverting said accepted mould moulds and raising said inverted and accepted moulds to a horizontal position immediately below a position of said reach of the second conveyor,
    (G) a third conveyor having a horizontal reach starting downstream of the rotating device,
        (i) said horizontal reach of the third conveyor being at a level that is the same as the level of an inverted mould lifted by the rotating device,
        (ii) said horizontal reach of the third conveyor being below the horizontal reach of the second conveyor and partially coextensive therewith downstream of the rotating device,
    (H) said reach of the second conveyor including a portion sloping upwardly from the horizontal portion thereof and located above a downstream portion of the third conveyor,
        (i) said upwardly extending reach of the second conveyor engaging inverted moulds on the third conveyor and raising said moulds off moulded product left on the third conveyor;
    (I) whereby filled moulds may be processed either by,
        (i) transferring filled moulds from the first conveyor to the second conveyor by the lifting means and bypassing the rotating device, or
        (ii) by transferring filled moulds from the first conveyor to the rotating device and then to the third conveyor and bypassing the lifting device.

2. A dual mode machine as set forth in claim 1 wherein the lifting device includes a lifting piston and in which, above the lifting piston and on both sides of the mould, supporting means is provided parallel to the second conveyor said supporting means being free to oscillate and being further provided with springs and a stop to maintain the supporting means in supporting position.

3. A dual mode machine as set forth in claim 1 in which there is provided controlled lateral clamps on said rotating device for locking the moulds to the rotating device during the rotation phase.

4. A dual mode machine as set forth in claim 1 in which the rotation device consists of walls defining a hollow body, two of said walls being mutually parallel and being in contact with filled moulds, said two walls being perforate, said machine further including means to supply compressed air to the interior of said body so that said air will issue through the perforate walls to form films between the walls and product adjacent the same.

* * * * *